(No Model.)
J. STAHL.
TREE COVER.
No. 349,066. Patented Sept. 14, 1886.
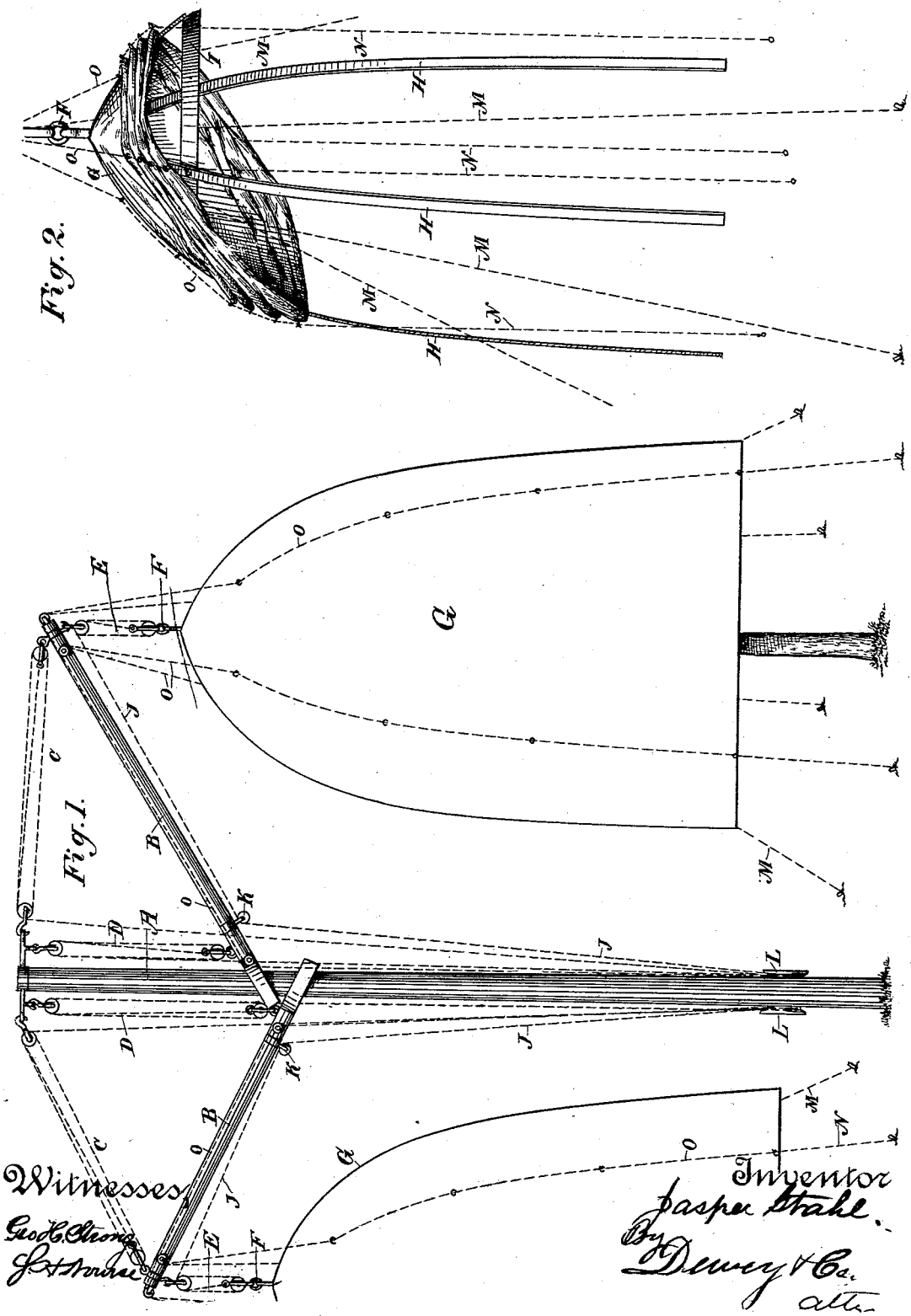

UNITED STATES PATENT OFFICE.

JASPER STAHL, OF SAN FRANCISCO, CALIFORNIA.

TREE-COVER.

SPECIFICATION forming part of Letters Patent No. 349,066, dated September 14, 1886.

Application filed July 6, 1886. Serial No. 207,278. (No model.)

*To all whom it may concern:*

Be it known that I, JASPER STAHL, of the city and county of San Francisco, State of California, have invented an Improvement in Tree-Covers; and I hereby declare the following to be a full, clear, and exact description of the same.

My invention relates to a device for covering trees, so as to inclose the tree for the purpose of introducing fumes to destroy scale or other insects which may be upon the tree, and, in connection with the cover, a mechanism by which it is raised, lowered, and adjusted, so as to be easily placed upon the tree and removed therefrom.

Referring to the accompanying drawings, Figure 1 is a view of the cover with the suspending-tackle, derrick, and booms. Fig. 2 is an enlarged view showing the spreaders for the cover and the means for putting it on and taking it off.

A is the mast, which may be set at any point, being suitable guyed or supported, and it is provided with booms B, projecting out from each side, having ropes C and pulleys, by which they may be raised, lowered, and adjusted to suit the height of the tree. The inner ends of these booms are also suspended by pulleys and ropes, as shown at D, so that they may be moved in or out, and the covers, which are suspended from their outer ends, can be moved to or from the mast by this adjustment, so as to be dropped over the trees, which may be at greater or less distances from it. Blocks E are suspended from the outer ends of the booms with hooks, which attach to a ring, F, in the top of the cover-frame, by which it is suspended.

The cover G is made of any suitable textile fabric, preferably of a sugar-loaf shape, and it is kept in shape by means of ribs or spreaders H and hoops I, to which these ribs are attached at suitable points.

J are the ropes by which the covers are raised or lowered, these ropes passing through eyes or leaders K and extending down the mast to cleats L, where they may be belayed or secured.

M M are ropes or guides, which have their upper end attached to the upper hoops, I, inside of the cover, and they extend down below the lower edge and are carried outward, having their ends fastened at some point away from the tree, so that when the cover is first dropped down its edges will fall upon these ropes, and it will thus be spread open to its farthest extent.

N N are other ropes connected with the bottom of the cover, by which it may be pulled down, sliding over the ropes M, and thence coming down so as to cover the whole of the tree without becoming entangled while being put on. As it is drawn down, the ropes J may be slackened, so as to let the cover down as far as is necessary to inclose the tree.

When it is desired to remove the cover, this is done by means of ropes O, which lead out upon the booms, and through eyes or leaders down outside of the cover to the lower edges, where they are fastened, and by pulling upon these ropes the cover is drawn upward from the lower edge and furled about the upper part, in the same manner that a sail is furled.

By this construction I am enabled to handle the covers easily, raise them above the top of the tree, lower them over the tree, spreading them at the same time, and drawing them down by direct action, removing them after the work is done in a similar manner.

Having thus described my invention, what I claim as new, and desire to secure by Letters Patent, is—

1. The tree-cover consisting of the open-bottomed flexible covering, in combination with the spreading arms or frame H, the supporting-hoops I, and suitable ropes for suspending and adjusting said cover, substantially as herein described.

2. The tree-cover consisting of the textile fabric with the interior spreaders and hoops, in combination with the mast having booms extending outward, and the supporting and regulating ropes, substantially as described.

3. The tree-cover consisting of the expansible textile fabric with its supporting-ribs and the suspending hooks and ropes, in combination with the vertical mast having the outwardly-projecting booms, the suspending ropes and pulleys D, by which the inner ends of the booms are adjusted, and the ropes C and pulleys, by which the outer ends are raised, lowered, and adjusted, substantially as described.

4. The tree-cover having the suspending adjustable ropes and the interior hoops and spreaders, as shown, in combination with the ropes M, extending downward within the cover from the upper portion, for the purpose of expanding the bottom of the cover while it is being placed upon the tree, substantially as described.

5. The suspended tree-cover having the interior hoops and spreaders and the expanding-ropes M, in combination with the ropes N, whereby it may be drawn down, substantially as described.

6. The suspended expansible tree-cover having the interior hoops and spreaders and the ropes O, attached to the lower edge, passing up outside through leaders upon the upper part of the cover, thence down the boom and mast, substantially as described.

In witness whereof I have hereunto set my hand.

JASPER STAHL.

Witnesses:
S. H. NOURSE,
H. C. LEE.